3,449,337
5-AROYL-1,2,4-BENZOTHIADIAZINE-1,1-DIOXIDES

Stanley C. Bell, Penn Valley, Pa., assignor to American Home Products Corporation, New York, N.Y., a corporation of Delaware
No Drawing. Filed Apr. 12, 1968, Ser. No. 721,098
Int. Cl. C07d 93/32; C07c 143/80; A61k 27/00
U.S. Cl. 260—243                                2 Claims

ABSTRACT OF THE DISCLOSURE 7-chloro-1,2,4-benzothiadiazine-1,1-dioxides, substituted in the 5-position with aroyl groups, especially the 2,4-dichlorobenzoyl group (I), are prepared by condensing the corresponding 2-amino-5-chloro-3-(substituted-aroyl) benzenesulfonamide (II) with formic acid. Compounds (II) are prepared by reacting the corresponding 2-amino-5-chloro-3-(substituted-aroyl)benzophenone with chlorosulfonic acid-thionyl chloride and then with ammonia. Compounds (I) and (II) are pharmacologically active, especially as central nervous system depressants.

---

This invention relates to derivatives 1,2,4-benzothiadiazines, and more particularly to 5-aroyl-1,2,4-benzothiadiazine-1,1-dioxides having pharmacological activity.

*Description of the invention.*—The compounds contemplated by this invention are those of Formula I:

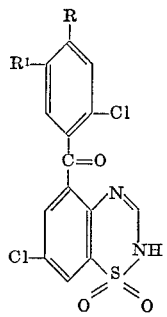

wherein
$R^1$ is hydrogen and R is chloro; or
$R^1$ is sulfamoyl and R is hydrogen.

As a specific embodiment of this invention there is mentioned 7-chloro-5-(2,4-dichlorobenzoyl) - 2H - 1,2,4-benzothiadiadine-1,1-dioxide, a compound of Formula I wherein $R^1$ is hydrogen and R is chloro. Compounds of Formula I are pharmacologically active as central nervous system depressants and are of value to induce calming.

Also contemplated are compounds of Formula II;

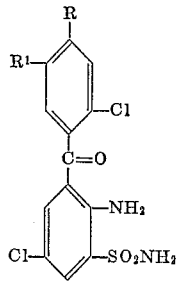

wherein
$R^1$ is hydrogen and R is chloro; or
$R^1$ is sulfamoyl and R is hydrogen.

As specific embodiments of this invention there are mentioned 2-amino-5-chloro-3-(2,4-dichlorobenzoyl)benzenesulfonamide, a compound of Formula II wherein $R^1$ is hydrogen and R is chloro; and
2-amino-5-chloro-3-(2 - chloro - 5 - sulfamoylbenzoyl) benzenesulfonamide, a compound of Formula II wherein $R^1$ is sulfamoyl and R is hydrogen. As will be shown hereinafter, compounds of Formula II are valuable as intermediates in the preparation of compounds of Formula I. In addition they are valuable per se, possessing activity in standard pharmacological tests as central nervous system depressants and are of value to induce calming.

The compounds of this invention can be prepared from readily accessible starting materials by a number of different procedures. One convenient pathway is outlined as follows:

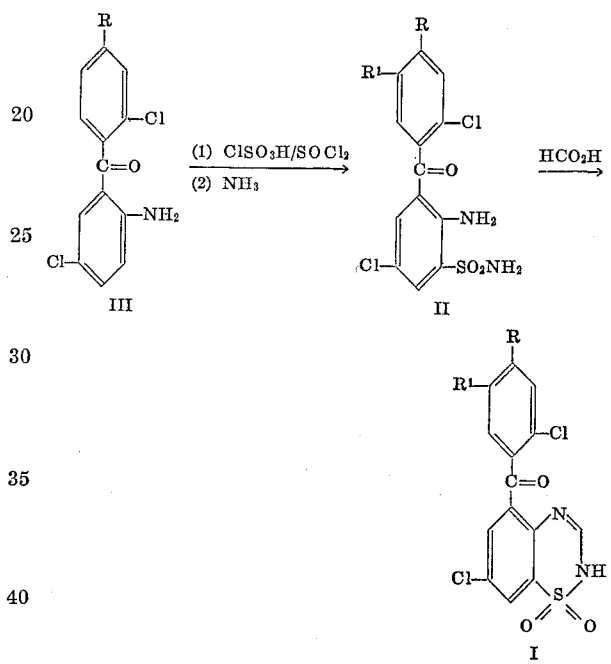

wherein R and $R^1$ are as defined hereinabove. The pathway comprises reacting an appropriately substituted aminodichlorobenzophene (III) with chlorosulfonic acid and thionyl chloride, then with ammonia to form the corresponding sulfamylaminodichlorobenzophenone (II) which is then reacted with formic acid to provide the benzothiadiazine-1,1-dioxide (I). Generally, a mixture of III and about 2 parts by weight of chlorosulfonic acid can be heated at about 80° to 100° C. for from about 2 hours, then it is cooled and treated with about 0.6 parts by weight of thionyl chloride. The mixture is refluxed for about 30 minutes, cooled and decomposed on ice to provide the corresponding sulfonyl chloride. This is converted to the sulfamyl compound (II) by refluxing in a mixture of 1:1 ethanol-concentrated aqueous ammonia. Dilution of the mixture with water causes precipitation of the compound of Formula II, which can be collected and dried, then used, if desired, to make the compound of Formula I. It can be purified by reprecipitations with acetic acid from an alkaline solution of alcohol and water. Compounds (I) can be prepared by suspending the compounds of Formula II in about 50 parts by weight of formic acid and refluxing the mixture. If the mixture is refluxed for about 17 hours, then allowed to cool, the product of Formula I precipitates from the reaction mixture whereupon it can be recovered by filtration and dried.

The compounds of Formulae I and II of this invention have demonstrated pharmacological activity. In particular they have been found to exert a depressant action on the central nervous system when tested under standard and accepted pharmacological procedures in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents, such as the need to induce a calming effect.

The compounds of Formulae I and II of this invention may be administered either alone or in combination with other pharmacologically active ingredients. Whether singly or in combination, they may be used in the form of solid compositions for oral administration combined, if desired, with extenders or carriers that are relatively non-toxic or inert. They may be put into tablet, capsule or powder form. On the other hand, they may be administered in liquid form as a suspension or solution in a suitable vehicle for parenteral use. By way of illustration pharmacological action as central nervous system depressant agents in mice have been demonstrated when the compound is administered at a dosage of 127 mg./kg.

The starting material of Formula III which is 2-amino-2′,5-dichlorobenzophenone is available commercially and can also easily be prepared. The other starting material of Formula III can be prepared by a conventional technique comprising condensing p-chloroaniline with 2,4-dichlorobenzoyl chloride in the presence of zinc chloride or aluminum chloride.

*Description of the preferred embodiments.*—The following examples are given by way of illustration and are not to be construed as limitations of this invention, many variations of which are possible without departing from the scope and spirit thereof.

EXAMPLE 1

2-amino-5-chloro-3-(2,4-dichlorobenzoyl) benzenesulfonamide

A mixture of 23.0 g. of 2-amino-2′,4′,5-trichlorobenzophenone and 50 ml. of chlorosulfonic acid is heated on a steam bath for 2 hrs., cooled and treated with 15 ml. of thionyl chloride. After refluxing for ½ hr., the reaction mixture is chilled and carefully decomposed on ice. The resultant crude sulfonyl chloride (26 g.) is added to a solution of 400 ml. of ethanol and 400 ml. of conc. ammonium hydroxide and is refluxed for ½ hr. and diluted with 400 ml. of water. The resultant solid is collected and washed with cold ethanol to give 7.5 g., M.P. 240–242° C. The product is purified by reprecipitations with acetic acid from an alkaline solution of alcohol and water and has a M.P. 244–246° C.

*Analysis.*—Calcd. for $C_{13}H_9Cl_3N_2O_3C$: C, 41.12; H, 2.39; Cl, 28.02; N, 7.38; S, 8.45. Found: C, 41.28; H, 2.40; Cl, 28.15; N, 7.47; S, 8.44.

EXAMPLE 2

2-amino-5-chloro-3-(2-chloro-5-sulfamoylbenzoyl) benzenesulfonamide 2-amino-2′,5-dichlorobenzophenone is converted to the product, M.P., 235–236° C., by the procedure of Example 1.

*Analysis.*—Calcd. for $C_{13}H_{11}Cl_2N_3O_3S_2 \cdot H_2O$: Cl, 16.03; N, 9.50. Found: Cl, 16.12; N, 9.59.

EXAMPLE 3

7-chloro-5-(2,4-dichlorobenzoyl)-2H-1,2,4-benzothiadiazine-1,1-dioxide

A mixture of 4.5 g. of 2-amino-5-chloro-3-(2,4-dichlorobenzoyl)benzenesulfonamide and 180 ml. of formic acid is refluxed for 17 hrs. On cooling, 3.8 g. of Product, M.P. >300°C., separates out.

*Analysis.*—Calcd. for $C_{14}H_7Cl_3N_2O_3S$: C, 43.15; H, 1.81; Cl, 27.30; N, 7.19; S, 8.23. Found: C,43.49; H, 2.09; Cl, 27.38; N, 7.26; S, 8.41.

EXAMPLE 4

7-chloro-5-(2-chloro-5-sulfamoylbenzoyl)-2H-1,2,4-benzothiadiazine-1,1-dioxide

A mixture of 4.5 g. of 2-amino-5-chloro-3-(2-chloro-5-sulfamoylbenzoyl)benzenesulfonamide and 180 ml. of formic acid is refluxed for 17 hrs. On cooling, the product separates out.

In evaluating the instant compounds for pharmacological activity, they are tested in vivo by standard methods with the following results.

The compound is administered to three mice (CF–1 14 to 24 grams) at each of the following doses: 400, 127, 40 and 12.7 mg./kg.

The animals are watched for signs of general stimulation, general depression and antonomic activity and the observations are evaluated by methods described in detail in Turner, Screening Methods in Pharmacology, Academic Press, New York, p. 80 (1965), in the section entitled "A Test Group for Central Depressants."

2 - amino - 5 - chloro-3-(2-chloro-5-sulfamoylbenzoyl) benzenesulfonamide, administered intraperitoneally in saline, caused decreased motor activity and decreased respiration at 127 mg./kg. There were no deaths following administration of this compound at the highest dose used, 400 mg./kg.

I claim:
1. A compound of the formula:

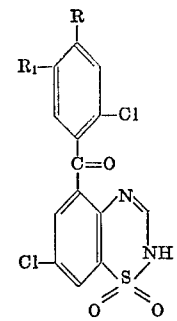

wherein
$R^1$ is hydrogen and R is chloro; or
$R^1$ is a sulfamoyl and R is hydrogen.

2. A compound as defined in claim 1 which is 7-chloro-5 - (2,4 - dichlorobenzoyl)-2H-1,2,4-benzothiadiazine-1,1-dioxide.

References Cited
UNITED STATES PATENTS
3,345,365  10/1967  Topliss et al.

NICHOLAS S. RIZZO, *Primary Examiner.*

U.S. Cl. X.R.
260—556; 424—246